(12) United States Patent
Yang

(10) Patent No.: US 9,671,571 B2
(45) Date of Patent: Jun. 6, 2017

(54) FLAT PANEL WAVEGUIDE DISPLAY AND SYSTEM

(71) Applicant: Wenjun Yang, Shanghai (CN)

(72) Inventor: Lei Yang, Shanghai (CN)

(73) Assignee: Wenjun Yang, Shanghai (CN)

( * ) Notice: Subject to any disclaimer, the term of this patent is extended or adjusted under 35 U.S.C. 154(b) by 0 days.

(21) Appl. No.: 14/404,897

(22) PCT Filed: May 22, 2013

(86) PCT No.: PCT/CN2013/076036
§ 371 (c)(1),
(2) Date: Dec. 1, 2014

(87) PCT Pub. No.: WO2013/178029
PCT Pub. Date: Dec. 5, 2013

(65) Prior Publication Data
US 2015/0147019 A1     May 28, 2015

(30) Foreign Application Priority Data
May 29, 2012   (CN) .......................... 2012 1 0172215

(51) Int. Cl.
*G02B 6/42*     (2006.01)
*F21V 8/00*     (2006.01)
(Continued)

(52) U.S. Cl.
CPC ............. *G02B 6/42* (2013.01); *G02B 6/0035* (2013.01); *G09G 3/3473* (2013.01);
(Continued)

(58) Field of Classification Search
CPC .............................. G02B 6/005; G02B 6/0035
See application file for complete search history.

(56) References Cited

U.S. PATENT DOCUMENTS 6,608,961 B2 * 8/2003 Travis ..................... C03B 18/04
348/E5.138
6,714,711 B1 * 3/2004 Lieberman ......... G01N 21/7703
362/552
(Continued)

FOREIGN PATENT DOCUMENTS

CN          1217539        8/2005
CN        101881936       11/2010
(Continued)

*Primary Examiner* — Omar R Rojas
(74) *Attorney, Agent, or Firm* — Hamre, Schumann, Mueller & Larson, P.C.

(57) ABSTRACT

The invention provides a flat panel waveguide display, including: a fan out region, configured to allow light to experiences total internal reflection therein; a screen region, which comprises a front surface, a back surface and several side surfaces, the front surface is opposite to the back surface, wherein one side surface of the screen region optically connects to one side surface of the fan out region; and a first dielectric layer, coated on entire surface of the front surface of the screen region, wherein both of the fan out region and the screen region are made of waveguide material; wherein the first dielectric layer is divided into a first group of sections along direction of light path of light entering from the fan out region into the screen region, refractive index of each section of the first group is different from one another. Accordingly, the invention further provides a flat panel waveguide display system.

10 Claims, 6 Drawing Sheets

(51) Int. Cl.
*H04N 9/31* (2006.01)
*G09G 3/34* (2006.01)
(52) U.S. Cl.
CPC ......... *H04N 9/3141* (2013.01); *G02B 6/0028* (2013.01); *G02B 6/0076* (2013.01)

(56) References Cited

U.S. PATENT DOCUMENTS

| | | | | |
|---|---|---|---|---|
| 6,995,820 B2* | 2/2006 | Amimori | ............. | G02B 5/0215 349/112 |
| 7,914,196 B2* | 3/2011 | Parker | .................... | F21V 11/00 349/65 |
| 2013/0039094 A1* | 2/2013 | Kolb | ....................... | B29C 41/24 362/618 |

FOREIGN PATENT DOCUMENTS

| | | |
|---|---|---|
| CN | 102330950 | 1/2012 |
| EP | 2284594 | 2/2011 |

* cited by examiner

| Screen1 | Screen2 | Screen3 |
|---------|---------|---------|
| Screen4 | Screen5 | Screen6 |
| Screen7 | Screen8 | Screen9 |

Fig. 3E

FLAT PANEL WAVEGUIDE DISPLAY AND SYSTEM

FIELD OF THE INVENTION

This invention refers to an optical system, and particularly refers to a flat panel waveguide display and system. The flat panel waveguide display of this invention can be used as a flat waveguide display screen, a projection system, a flat panel waveguide touch screen, and a splice wall display system consists of flat panel waveguides.

BACKGROUND

Big screen displays are widely used in business and daily life.

Chinese Patent CN1217539C, for example, described a tapered waveguide display with a conventional projector, whose advantages include omission of light path required for conventional projection, thinner than traditional back projection display, so that it is comparable with liquid crystal or plasma displays. Since waveguide displays can be made of inexpensive optical glass or transparent plastics, costs for making large screens will be much lower than traditional flat panel techniques such as liquid crystal or plasma displays. In addition, waveguides do not contain any electronic components, therefore they are stable and robust compared with liquid crystal, plasma or LED displays. However, due to complex structures of the back side, serious distortions are introduced, which result in difficulty in designing such projection systems and the complicated geometric construction is also a disadvantage for mass production.

SUMMARY OF THE INVENTION

This invention creatively provides a flat panel waveguide display, including a fan out region allowing light experiencing total internal reflection therein; a screen region, which comprises a front surface, a back surface and several side surfaces, and the front surface is opposite to the back surface, wherein one side surface of the screen region optically connects to one side surface of the fan out region; and a first dielectric layer, coated on the front surface of the screen region; wherein both of the fan out region and the screen region are made of waveguide material; wherein the first dielectric layer is divided into a first group of sections along the direction of light path of light entering from the fan out region into the screen region, and refractive index of each section of the first group is different from one another. The structure of the fan out region and the screen region can be cuboid, tapered or of other shapes.

Preferably, in the said flat panel waveguide display, refractive index of each section in the first group of sections increases in sequence along the direction of light path of light entering from the fan out region into the screen region.

Preferably, the said flat panel waveguide display further includes a scattering film (also known as diffuser) coated on the first dielectric layer.

Preferably, in the said flat panel waveguide display, the scattering film further comprises an anti-reflection sub-layer between the waveguide and the first dielectric layer and/or between the first dielectric layer and the scattering film to eliminate partially reflection when light transmits from the waveguide to the first dielectric layer and transmits from the first dielectric layer to the scattering film.

Preferably, the said flat panel waveguide display further includes a second dielectric layer, coated on the back surface of the screen region; wherein the second dielectric layer is divided into a second group of sections along direction of light path of light entering from the fan out region into the screen region, and refractive index of each section in the second group of sections increases in sequence along the direction of light path of light entering from the fan out region into the screen region.

Preferably, in the said flat panel waveguide display, the fan out region is attached to the back surface of the screen region as a whole, and an optical reversing component connects to one side surface of the screen region and one side surface of the fan out region, respectively, optically connecting the side surface of the screen region with the side surface of the fan out region.

Preferably, in the said flat panel waveguide display, a projection interface is positioned at one side surface of the fan out region.

Preferably, in the said flat panel waveguide display, the projection interface includes chromatic dispersion correcting element used for compensating the chromatic dispersion generated when lights of different wavelengths enter into the fan out region.

Preferably, in the said flat panel waveguide display, a reflective layer is coated on the back surface of the screen region.

Preferably, in the said flat panel waveguide display, further includes an image sensor, positioned at the projection interface or positioned at any side surface of the fan out region and the screen region.

According to another aspect of the invention, a flat panel waveguide displays system is provided, which comprises: a plurality of flat panel waveguide displays, and each flat panel waveguide display further includes a fan out region, configured to allow light experiencing total internal reflection therein; a screen region, which comprises a front surface, a back surface and several side surfaces, and the front surface is opposite to the back surface, wherein one side surface of the screen region optically connects to one side surface of the fan out region; and a first dielectric layer, coated on the front surface of the screen region; wherein both of the fan out region and the screen region are made of waveguide material; wherein the first dielectric layer is divided into a first group of sections along direction of light path of light entering from the fan out region into the screen region, and refractive index of each section of the first group is different from one another; wherein the fan out region is attached to the back surface of the screen region as a whole, and an optical reversing component connects to one side surface of the screen region and one side surface of the fan out region, respectively, to optically connect the side surface of the screen region with the side surface of the fan out region; wherein the top of another side surface of the screen region that is opposite to the side surface connecting to the optical reversing component is designed to be a inclined plane; wherein the plurality of the flat panel waveguide displays contact with one another by means of the optical reversing component so as to connect the screen regions of the plurality of flat panel waveguide displays with one another.

It should be understood that both of the above general descriptions and the below detailed descriptions are exemplificative and illustrative, and intend to provide further explanation of the invention defined by the claims.

DESCRIPTIONS OF DRAWINGS

Drawings are provided for further understanding of the invention, which is attached herewith to constitute part of the application. Drawings illustrate embodiments of the invention, and explain the principle of the invention together with specification.

FIG. 1A~FIG. 1C show a first embodiment of the flat panel waveguide display of the invention.

FIG. 3C, FIG. 3D and FIG. 3E show a variant of the above third embodiment.

DETAILED DESCRIPTION OF THE INVENTION

Figures 1A, 1B:
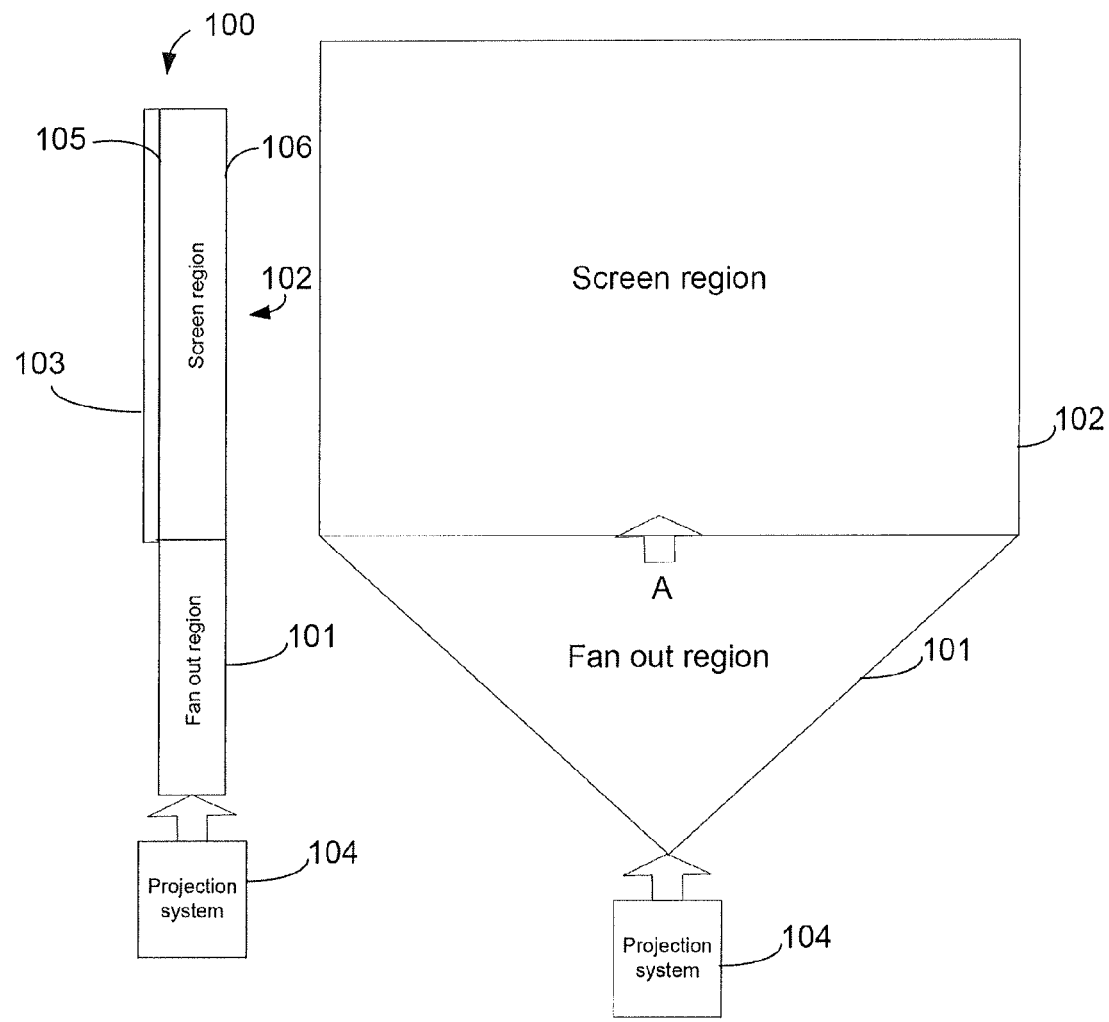
Figure 1C:
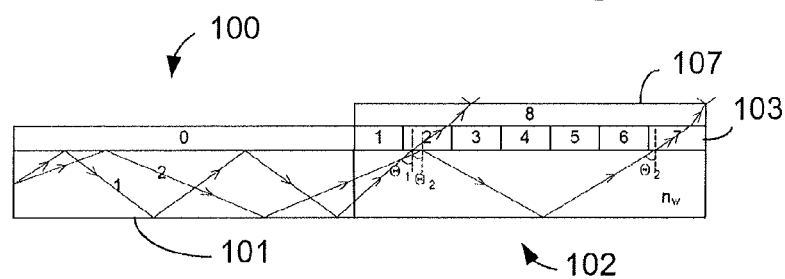

FIGS. 1A~1C illustrate an embodiment of the flat panel waveguide display of the invention. As shown by the Figure, a flat panel waveguide display 100 mainly includes: a fan out region 101, a screen region 102, and the first dielectric layer 103. One side surface of the fan out region 101 in the flat panel waveguide display 100 can receive light projected from a projection system 104, as shown in FIGS. 1A and 1B. The projection system 104, for example, can be holographic projector or normal projector optimized for the flat panel waveguide display 100 of the invention.

Light (light projected from the projection system 104 for example) is allowed to experience total internal reflection in the fan out region 101. The screen region 102 has a front surface 105, a back surface 106 and several side surfaces. One side surface of the screen region 102 optically connects to one side of the fan out region 101. Moreover, the first dielectric layer 103, for example, comprises of a series of coating films, which is coated on the entire front surface 105 of the screen region 102. Both of the fan out region 101 and the screen region 102 are made of waveguide material. In order to couple to the projection system 104, a projection interface (not showed in the figures) can be provided at another side surface of the fan out region 101 that is opposite to the above-mentioned side surface of the fan out region 101. Preferably, regarding color projection, a chromatic dispersion correcting element, such as prisms or special film-coated devices, can be provided in the projection interface to correct chromatic aberration occurring when lights with different wavelengths enter into the fan out region 101.

Especially, according to this invention, the first dielectric layer 103 is divided into a first group of sections along direction of light path of light entering from the fan out region 101 into the screen region 102 (e.g., the direction of arrow A in the FIG. 1B), for example, to make each section substantially vertical to the direction of arrow A as a whole. Refer to section 1 to section 7 in FIG. 1C. Refractive index of each section of the first group is different from one another. Preferably, the refractive index of each section in the first group increases in sequence along the direction of light path of light entering from the fan out region 101 into the screen region 102 (e.g., the direction of arrow A in the FIG. 1B), so that the incident angle of light that is allowed to exit a succeeding section along this direction is larger than the incident angle of light that is allowed to exit a preceding section. In other words, incident angles of lights that are allowed to exit individual sections increase gradually along the said direction, i.e., the direction of light propagation from the fan out region 101 to the screen region 102. Moreover, a reflection layer can be coated on the back surface of the screen region 102.

Furthermore, the first group of sections can be made of a single layer of a coating film having coatings with different refractive index coated on different sections, or can be made of multiple layers of coating films making different sections having equivalent different refractive index. Alternatively, the first group of sections can also be manufactured by pasting single sheet or multiple sheets coated with coatings of different refractive index, and sheets are made of materials having the same refractive index. In conclusion, the main concept of the first group of sections is to make refractive index of respective sections therein different by means of various embodiments.

According to a preferred embodiment of the invention, a scattering layer (diffuser) 107 can be coated on the first dielectric layer 103, as shown in FIG. 1C. The scattering layer 107 can further include an anti-reflection layer, which can be coated between the waveguide and the first dielectric layer and/or between the first dielectric layer and the scattering film to prevent reflection when light is supposed to transmit from the waveguide to the first dielectric layer and transmit from the first dielectric layer to the scattering film.

The basic principle of the flat panel waveguide display 100 is described below.

Light enter into the flat panel waveguide display 100 with an incident angle larger than angle of total internal reflection of interface, so as to experience total internal reflection within the fan out region 101. When light reaches the screen region 102, since sections in the first dielectric layer 103 on the screen region 102 have different refractive index (e.g., sections 1-7 in FIG. 1C), the light that experiences total reflection previously in the waveguide fails to meet the condition of total internal reflection any more, which will exit different areas on the screen region 102 (i.e., different sections of the first dielectric layer 103) to corresponding areas. The scattering layer 107 is a single layer or multiple layers of films, light from the sections 1-7 will scatter to form image after its entrance into the scattering layer 8. As shown in the figure, light ray 1 and light ray 2 meet the requirement of total internal reflection at the time of entrance into the waveguide, i.e. $n_w \sin\theta_1 > n_0$, $n_w \sin\theta_2 > n_0$. While $n_w$ is the reflective index of the waveguide, $n_0$ is the reflective index of coating film 0 (coating film 0 can be replaced with air with $n_0=1$). $\theta_1$ and $\theta_2$ are incident angle at the interface. When ray 1 and 2 propagate to section 2, $n_w \sin\theta_1 < n_2$ and $n_w \sin\theta_2 > n_2$. $n_2$ is the reflective index of the section 2, thereby the ray 1 does not fit the requirement of total internal reflection, and then will be transmitted to section 2. Ray 2 however will still propagate within the waveguide. When ray 2 propagates to section 7 after one more total internal reflection, where $n_w \sin\theta_2 < n_7$, $n_7$ is the reflective index of section 7, ray 2 does not fit the requirement of total internal reflection anymore, and then ray 2 will transmit into section 7. Rays, after entrance into scatting layer 107 from the sections 1-7, will be scattered into the air to form images. While the coating films are design to cooperate with a projection system, the waveguide is able to reproduce projection images of good quality, to form a display.

Figure 5:
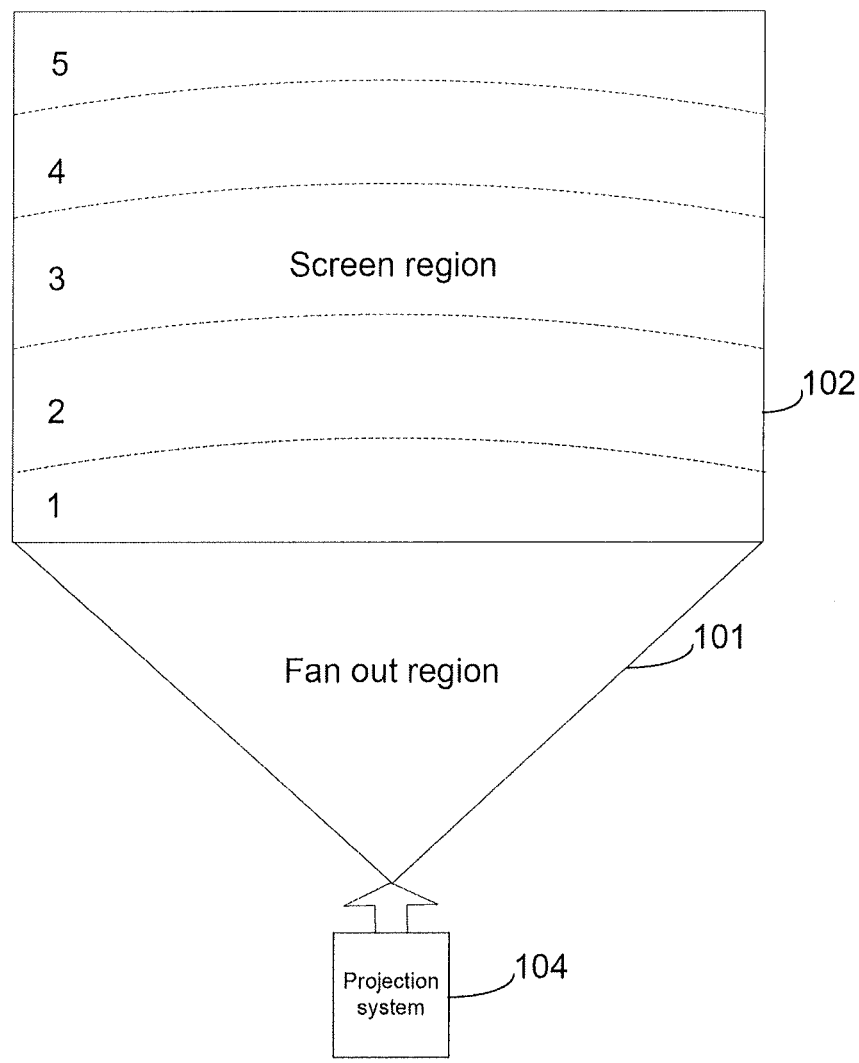
FIG. 5 and FIG. 6 show other embodiments of the flat panel waveguide display of the invention.

In addition, number of sections in the first dielectric layer 103 of the flat panel waveguide display 100 of the invention can be selected arbitrarily as required. For instance, FIG. 5 shows 5 sections, which are of five films with different reflective index. In accordance with a preferred embodiment of the invention, these sections are arc-shaped. A projection system 104 is located at the end of the waveguide. After light rays pass the fan out region, these light rays will exit at coating films with different refractive index on the screen, respectively, according to their different incident angle, so as to form images.

Figure 2:
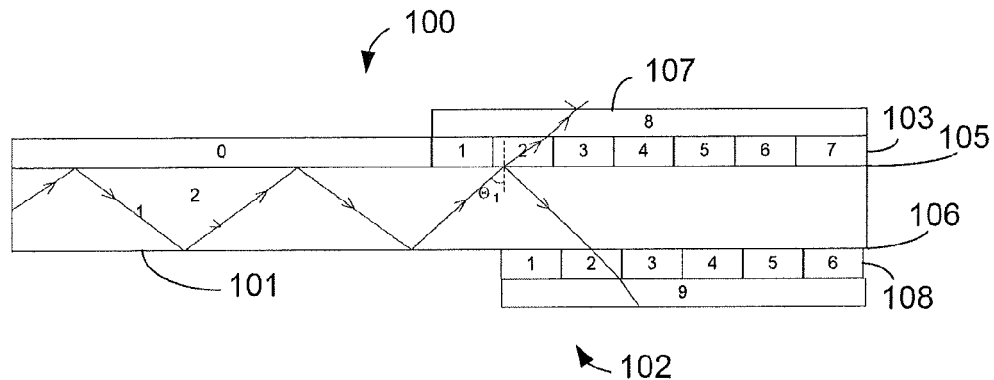
FIG. 2 shows a second embodiment of the flat panel waveguide display of the invention.

Turn to FIG. 2, which shows another embodiment of the flat panel waveguide display in accordance with the invention. The structure in FIG. 2 is similar to that in FIG. 1C, therefore same symbols and numbers are used to represent the same components in both figures, and descriptions regarding the same components are not repeated for brevity.

Compared to the embodiment in FIG. 1C, the embodiment in FIG. 2 further includes a second dielectric layer 108. This second dielectric layer 108 is coated on part of the back surface 106 of the screen region 102. For example, in the embodiment shown by FIG. 2, the second dielectric layer 108 contains one section less than the first dielectric layer 107.

In particular, similar to the first dielectric layer 103 as described above, the second dielectric layer 108 is divided into a second group of sections along direction of light path of light entering from the fan out region 101 into the screen region 102, for example, to make each section in these sections substantially vertical to the direction of light path of light entering from the fan out region 101 into the screen region 102. Referring to section 1 to section 6 in the second dielectric layer 108 in FIG. 2, the refractive index of each section in the second group increases in sequence along the direction of light path of light entering from the fan out region 101 into the screen region 102, so that incident angle of light that is allowed to exit a succeeding section along this direction is larger than the incident angle of light that is allowed to exit a preceding section. In other words, the incident angles of the light that is allowed to exit individual sections increases gradually along the said direction.

Additionally, the second group of sections can be made of a single layer of coating film having coatings with different refractive index coated on different sections, or can be made of multiple layers of coating films to make different sections having equivalent different refractive index. Alternatively, the second group of sections can also be manufactured by pasting single sheet or multiple sheets coated with coatings of different refractive index, and sheets are made of materials having the same refractive index. In conclusion, the main concept of the second group of sections is to make refractive index of respective sections therein different by means of various embodiments.

According to this embodiment, there is a dielectric layer, i.e., a second dielectric layer 108 disposed on the back surface 106 of the screen region 102, in order to eliminate conjugate image resulted from secondary reflection, or make the waveguide to be a double-side display.

Figures 3A, 3B:
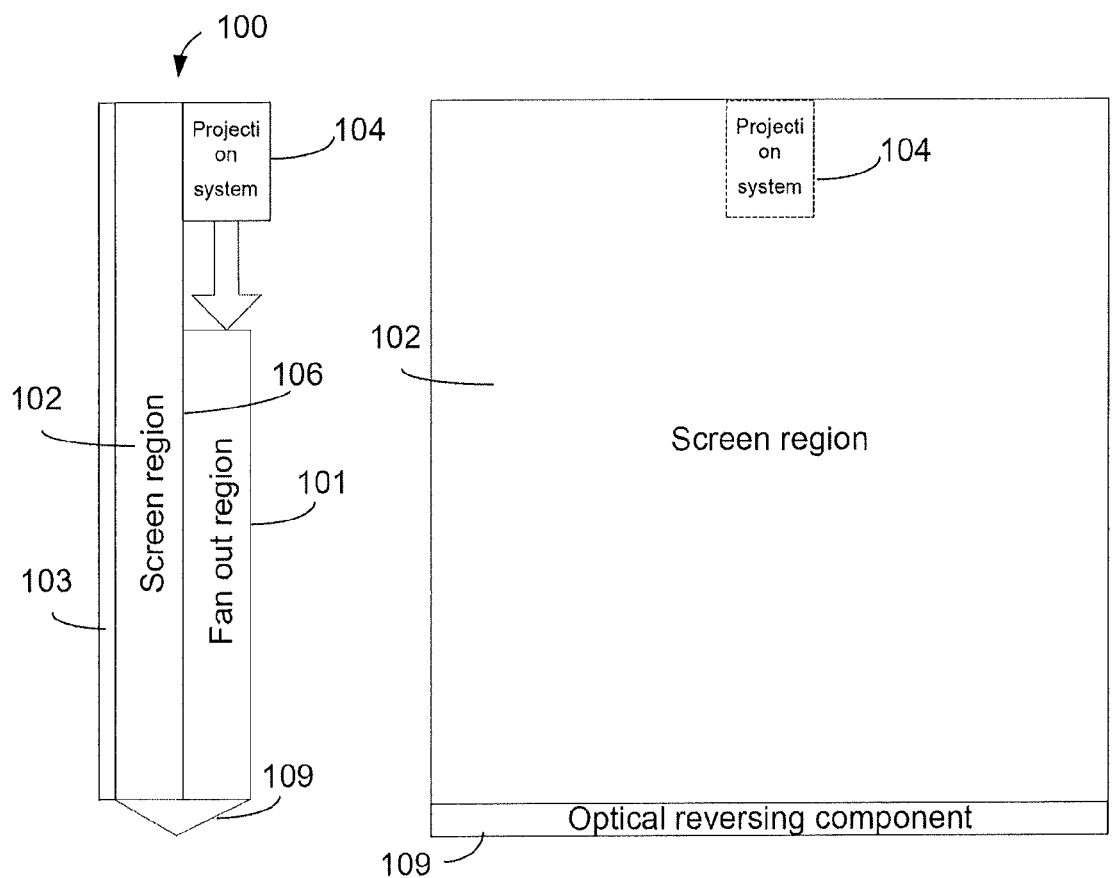
FIG. 3A and FIG. 3B show a third embodiment of the flat panel waveguide display of the invention.

FIG. 3A and FIG. 3B show a third embodiment of the flat panel display of the invention. Structures shown in FIG. 3A and 3B are similar to those in FIGS. 1A and 1B, therefore the same numbers and symbols are used to represent the same components, and descriptions regarding the same components are not repeated for brevity.

Compared to the embodiment in FIGS. 1A and 1B, the fan out region 101 of the embodiment shown in FIG. 3A and FIG. 3B is attached to the back surface 106 of the screen region 102. An optical reversing component 109 connects one side surface of the screen region 102 and one side surface of the fan out region 101 respectively, so as to optically connect the side surface of the screen region 102 with the side surface of the fan out region 101. In other words, the optical reversing component 109 can allow the projecting light from the projection system 104 being transmitted to the screen region 102 after fanned out by the fan out region 101. According to this embodiment, the fan out region 101 is folded over to the back surface of the screen region 102, and makes the waveguide render the same shape as the normal display.

Figure 3C:
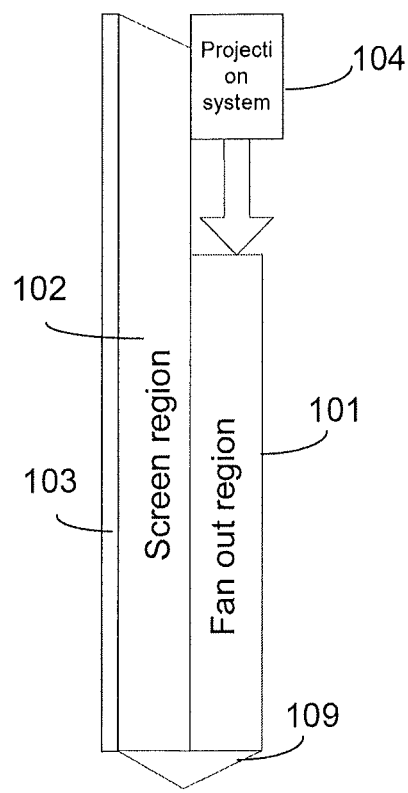
Figure 3D:

FIGS. 3C, 3D and 3E shows a variant embodiment according to the above third embodiment. With regard to this variant, more preferably, the top of another side surface of the screen region 102 that is opposite to the side surface connecting to the optical reversing component 109 is designed to be a inclined plane, as shown by FIG. 3C, so that a plurality of waveguides can be seamlessly combined to form an ultra large screen as illustrated by FIGS. 3D and 3E.

Figure 4:
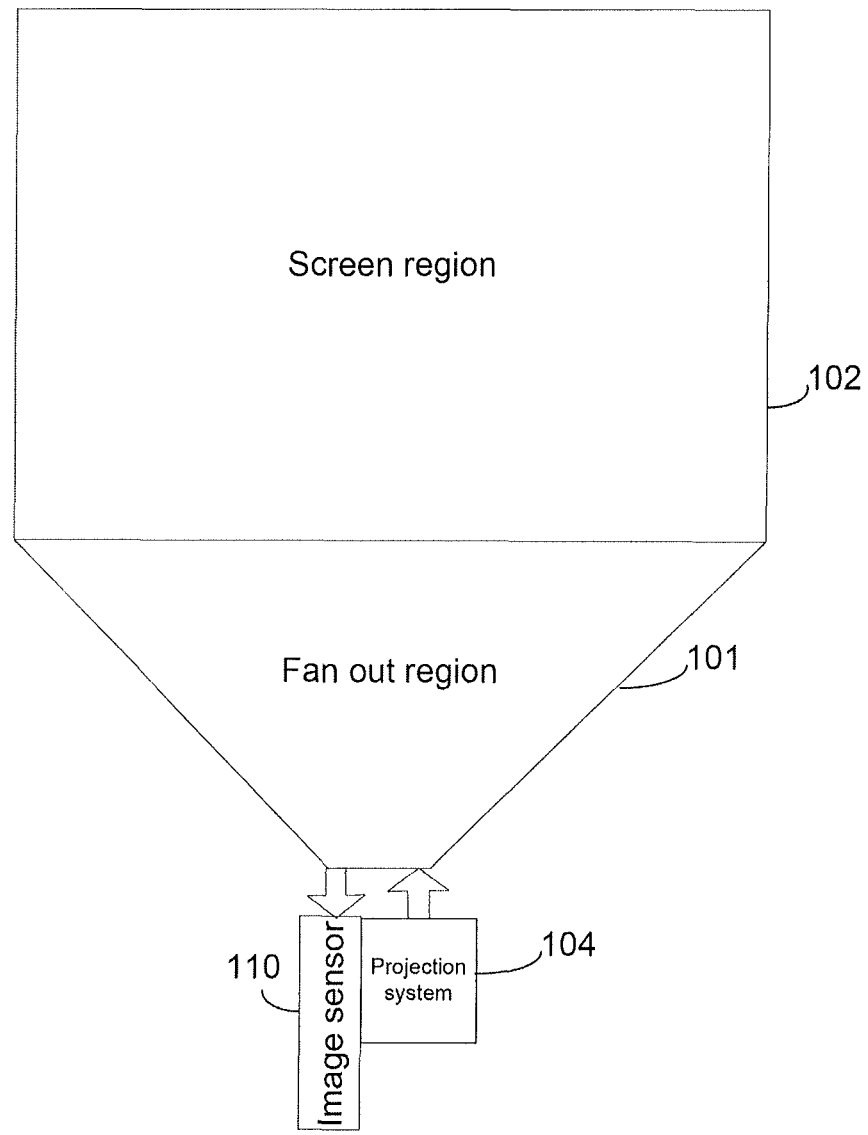
FIG. 4 shows a fourth embodiment of the flat panel waveguide display of the invention.

FIG. 4 shows a fourth embodiment of the flat panel display of the invention. Thanks to reversibility of light path, when this embodiment replaces the projection system 104 with an image sensor 110 (also known as light sensor) (e.g. a camera) or when an image sensor 110 is placed next to a side surface of the waveguide (i.e., the fan out region 101 and the screen region 102), e.g., placed next to the projection system 104, the image sensor 110 is able to sense change of light on the screen region 102. By means of record and process by a computer, the flat panel waveguide display 100 can be turned into a touch screen or a camera.

Figure 6:
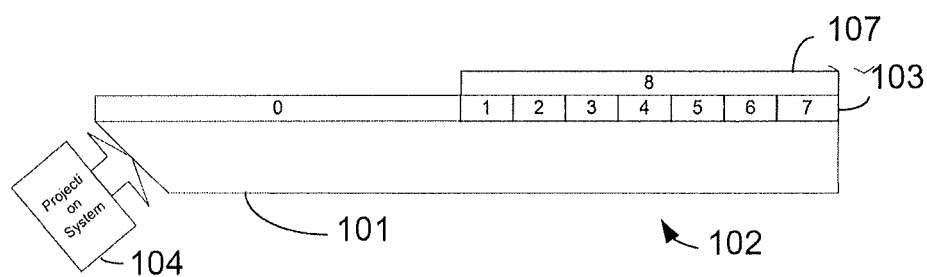

Furthermore, the interface of the waveguide which receives light from the projection system 100 can be designed to be inclined plane, as shown in FIG. 6.

It is apparent for one person skilled in the art that the above exemplificative embodiments about the invention can be modified and varied without departure from the principle and scope of the invention. Thus, the invention covers modification and variant fallen in the scope of the appended claims and equivalent technical solutions.

The invention claimed is:

1. A flat panel waveguide display of a projection system, comprising:
   a fan out region, being configured to allow light to experience total internal reflection therein;
   a screen region, including a front surface, a back surface, and several side surfaces, the front surface is opposite to the back surface, wherein one side surface of the screen region optically connects to one side surface of the fan out region; and
   a first dielectric layer, coated on the front surface of the screen region,
   wherein both of the fan out region and the screen region are made of waveguide material;
   wherein the first dielectric layer is divided into a first group of sections along a direction of light path of light entering from the fan out region into the screen region, a refractive index within each section of the first group of sections is the same, and the refractive index of each section among the first group of sections is different from one another,
   wherein the refractive index of each section in the first group of sections increases in sequence along the direction of light path of light entering from the fan out region into the screen region.

2. A flat panel waveguide display of a projection system according to claim 1, further including a scattering film coated on the first dielectric layer.

3. A flat panel waveguide display of a projection system according to claim 2, wherein the scattering film further comprises an anti-reflection sub-layer.

4. A flat panel waveguide display of a projection system according to claim 1, further including:

a second dielectric layer, coated on the back surface of the screen region;

wherein the second dielectric layer is divided into a second group of sections along direction of light path of light entering from the fan out region into the screen region, refractive index of each section in the second group of sections increases in sequence along the direction of light path of light entering from the fan out region into the screen region.

5. A flat panel waveguide display of a projection system according to claim 1, wherein the fan out region is attached to the back surface of the screen region as a whole, and an optical reversing component connects to one side surface of the screen region and one side surface of the fan out region, respectively, to optically connect one side surface of the screen region with one side surface of the fan out region.

6. A flat panel waveguide display of a projection system according to claim 1, wherein a projection interface is positioned at the one side surface of the fan out region.

7. A flat panel waveguide display of a projection system according to claim 6, wherein the projection interface includes a chromatic dispersion correcting element used for compensating the chromatic dispersion generated when lights of different wavelengths enter into the fan out region.

8. A flat panel waveguide display of a projection system according to claim 1, wherein a reflective layer is coated on the back surface of the screen region.

9. A flat panel waveguide display of a projection system according to claim 6, further including:

an image sensor, positioned at the projection interface or positioned at any side surface of the fan out region and the screen region.

10. A flat panel waveguide display system, including:

a plurality of flat panel waveguide displays, and each flat panel waveguide display further includes:

a fan out region, configured to allow light to experience total internal reflection therein;

a screen region, which comprises a front surface, a back surface and several side surfaces, the front surface is opposite to the back surface, wherein one side surface of the screen region optically connects to one side surface of the fan out region; and a first dielectric layer, coated on the front surface of the screen region, wherein both of the fan out region and the screen region are made of waveguide material;

wherein the first dielectric layer is divided into a first group of sections along direction of light path of light entering from the fan out region into the screen region, refractive index of each section of the first group is different from one another;

wherein the fan out region is attached to the back surface of the screen region as a whole, and an optical reversing component connects to one side surface of the screen region and one side surface of the fan out region, respectively, to optically connect one side surface of the screen region with one side surface of the fan out region;

wherein the top of another side surface of the screen region that is opposite to the side surface connecting to the optical reversing component is designed to be a inclined plane;

wherein the plurality of the flat panel waveguide displays contact with one another by means of the optical reversing component so as to connect the screen regions of the plurality of flat panel waveguide displays with one another.

* * * * *